Sept. 21, 1943.  R. B. WELLBORN  2,329,801
PIPE PLUG STRUCTURE
Filed April 15, 1943  2 Sheets-Sheet 1
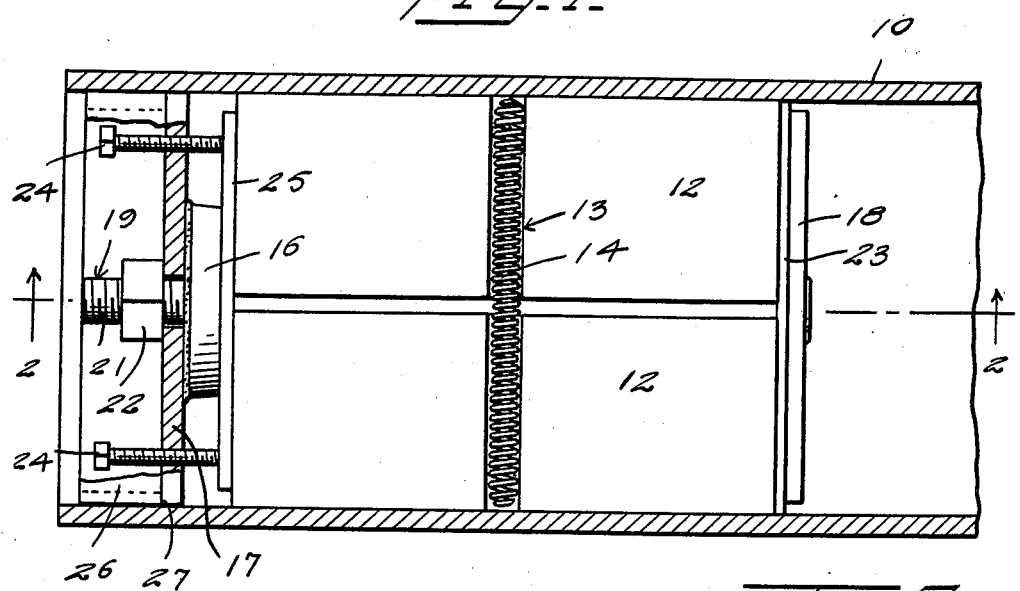
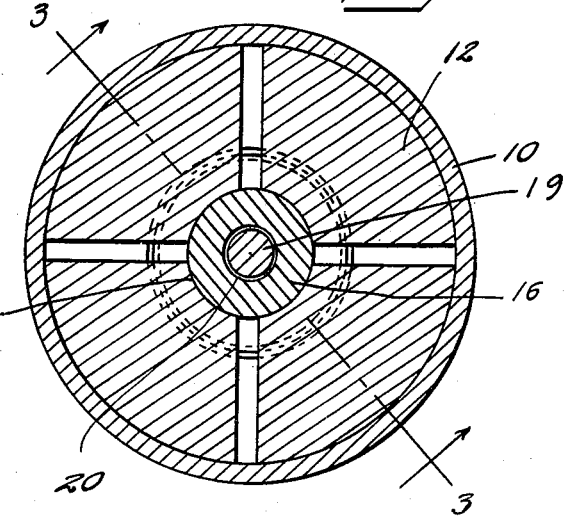
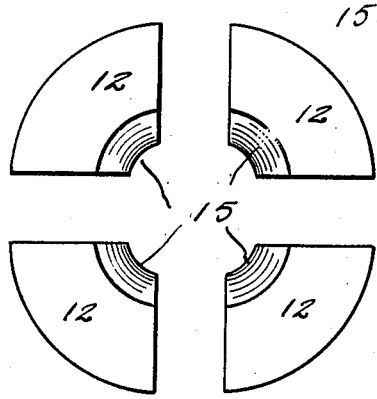
Inventor
R. B. Wellborn
By L. F. Randolph
Attorney

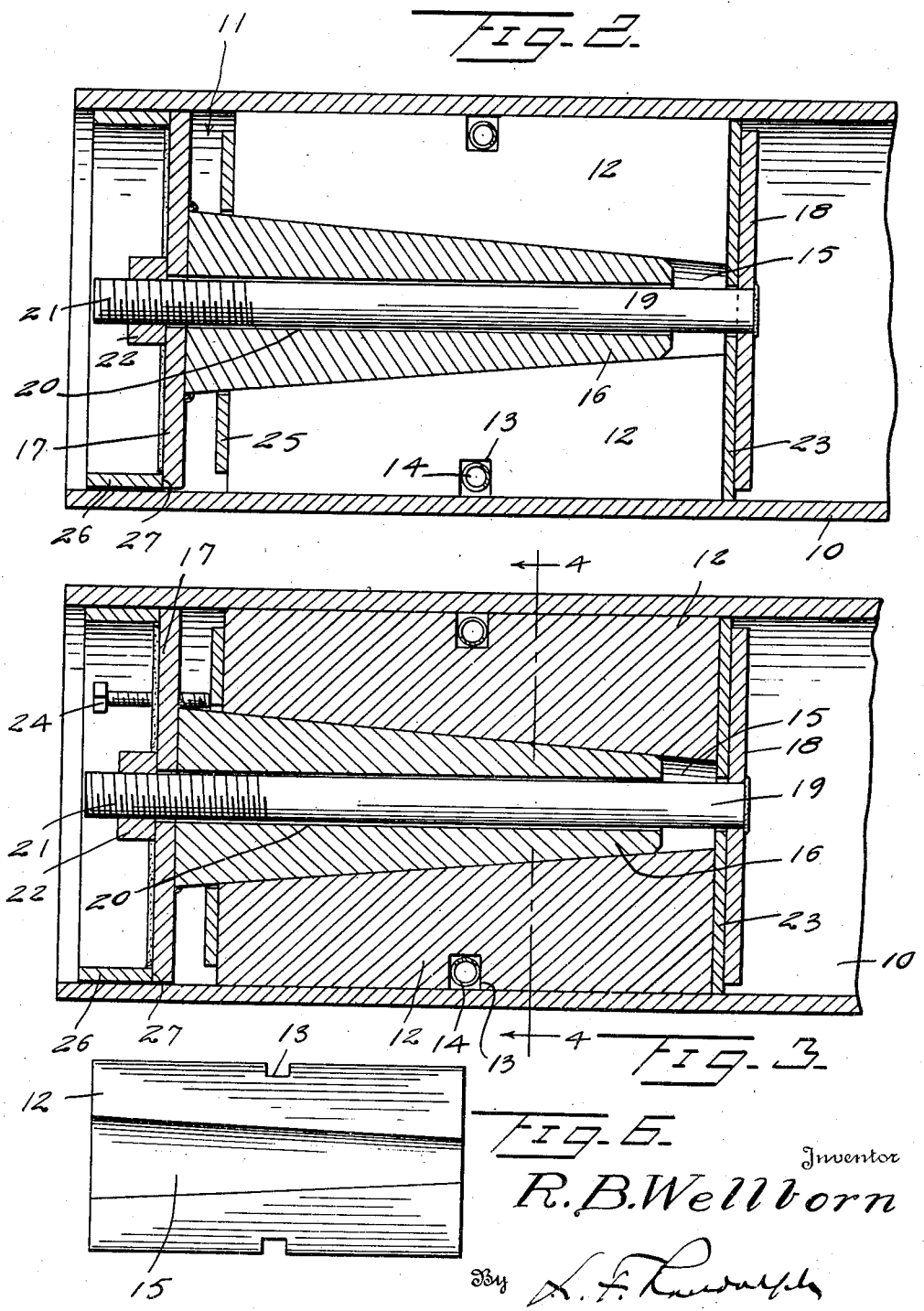

Patented Sept. 21, 1943

2,329,801

UNITED STATES PATENT OFFICE 2,329,801

PIPE PLUG STRUCTURE

Robert B. Wellborn, Pascagoula, Miss.

Application April 15, 1943, Serial No. 483,187

6 Claims. (Cl. 138—89)

This invention relates to a plug adapted for closing an end of metal pipe prior to packing pipe with sand and bending the same.

It particularly is aimed to provide a structure which is readily applicable and removable to and from the pipe, which will not be unduly affected by the heat incidental to bending, and a novel construction which is expansible and which in addition has means forcibly to dislodge the plug sections should they become unduly tight or wedged in place.

The more specific objects and advantages will become apparent from a consideration of the description following taken in connection with accompanying drawings illustrating an operative embodiment.

In said drawings:

Figure 1 is a view showing a fragment of pipe in longitudinal section, with my improved plug therein, and partly in section and broken away Figure 2 is a longitudinal section taken on the line 2—2 of Figure 1;

Figure 3 is a longitudinal section taken on the line 3—3 of Figure 4;

Figure 4 is a cross-sectional view taken on the line 4—4 of Figure 3;

Figure 5 is an end elevation of the plug segments or sections, in spaced relation; and Figure 6 is a plan view looking toward the inner surface of one of the plug sections or segments.

Referring specifically to the drawings wherein like reference characters designate like or similar parts, 10 designates a fragment of a length of metallic pipe which is to be packed with sand and bent with the aid of heat. Prior to the packing of the sand into the pipe my improved plug is applied in the pipe and the same is generally designated 11. This plug has a cylindrical body made up of sections or segments 12, for instance of wood, all of which are peripherally grooved as at 13 in order to accommodate an endless contractile metallic coil spring 14. Said spring 14, being contractile, tends to draw the segments or sections 12 toward the center of the pipe and plug.

Said sections 12 may be of any desired number and centrally of the device they have longitudinal surfaces 15 collectively forming a cone and fitting an expanding cone 16, the latter being preferably of metal.

Cone 16 at its base end is integral with or welded to a plate 17. Adjacent the forward end of the plug sections 12 is a metallic plate or disc 18 having a bolt 19 welded thereto or otherwise rigid therewith and passing longitudinally through a bore opening 20 of the cone 16. Said bolt is screw-threaded at 21 and a nut 22 is threaded thereto and adapted to bear against the plate 17 for operation to draw the bolt 19 and plate 18 toward the plate 17 while the latter and cone 16 are moved toward plate 18 to expand the sections 12 into tight peripheral engagement with the bore wall of the pipe 10.

In order to fill the spaces between sections 12 I provide an asbestos mat or gasket 23 between plate 18 and adjacent ends of the plug sections 12.

In removing the plug from the pipe, nut 22 is loosened and ordinarily the plug sections are collapsible so as to permit ready removal. However, should they stick or be unduly wedged in place, I operate one or all set screws shown at 24, which are screw-threaded in the plate 17, against an ejector ring 25, loose on the cone 16 and disposed between the plate 17 and adjacent ends of the segments or sections 12. The ring 25 preferably is metallic and the operation described will cause the same to push the sections 12 away from the plate 17, thus loosening them.

In order to protect the set screws 24 I provide an outwardly extending annular flange 26 marginally of the plate 17 and in practice it may be made separate therefrom and welded thereto as at 27.

It is clear that the plug or structure may be made in various sizes to fit pipes of various diameters.

I claim as my invention:

1. A pipe plug of the class described comprising an expansible cylindrical body, a conical plug fitted in said body, a plate operable against one end of said body, a plate from which said cone extends, one of said plates having a bolt extending from it through the cone and the other plate, and a nut operable on the bolt and against the last-mentioned plate.

2. A pipe plug of the class described comprising an expansible cylindrical body, a conical plug fitted in said body, a plate operable against one end of said body, a plate from which said cone extends, one of said plates having a bolt extending from it through the cone and the other plate, and a nut operable on the bolt and against the last-mentioned plate, and heat-resisting material held in place by the plate from which the bolt extends and against the inner end of the body.

3. A pipe plug of the class described comprising an expansible cylindrical body, a conical plug fitted in said body, a plate operable against one end of said body, a plate from which said cone extends, one of said plates having a bolt extending from it through the cone and the other plate, and a nut operable on the bolt and against the last-mentioned plate, and heat-resisting material held in place by the plate from which the bolt extends and against the inner end of the body, said material being asbestos.

4. A pipe plug of the class described comprising an expansible cylindrical body, a conical plug fitted in said body, a plate operable against one end of said body, a plate from which said cone extends, one of said plates having a bolt extending from it through the cone and the other plate, and a nut operable on the bolt and against the last-mentioned plate, means operably mounted by the last-mentioned plate to dislodge the body in the event of undue wedging.

5. A pipe plug of the class described comprising an expansible cylindrical body, a conical plug fitted in said body, a plate operable against one end of said body, a plate from which said cone extends, one of said plates having a bolt extending from it through the cone and the other plate, and a nut operable on the bolt and against the last-mentioned plate, means operably mounted by the last-mentioned plate to dislodge the body in the event of undue wedging, consisting of bolt means, and a plate mounted loosely on the cone between one end of the body and the adjacent plate against which the bolt means operates.

6. A pipe plug of the class described comprising an expansible cylindrical body, a conical plug fitted in said body, a plate operable against one end of said body, a plate from which said cone extends, one of said plates having a bolt extending from it through the cone and the other plate, and a nut operable on the bolt and against the last-mentioned plate, means operably mounted by the last-mentioned plate to dislodge the body in the event of undue wedging, consisting of bolt means, and a plate mounted loosely on the cone between one end of the body and the adjacent plate against which the bolt means operates, and an annular flange on the last-mentioned plate means extending outwardly therefrom as a protection for said screw means.

ROBERT B. WELLBORN.